J. G. PERRIN.
TIRE CARRIER FOR AUTOMOBILES.
APPLICATION FILED NOV. 11, 1912. RENEWED MAY 22, 1917.
1,251,689.
Patented Jan. 1, 1918.
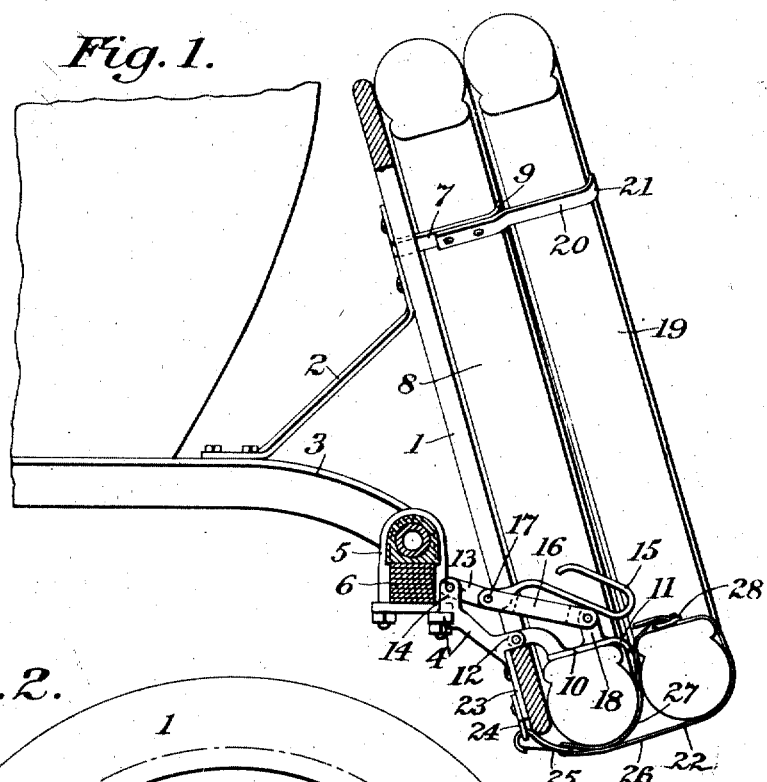
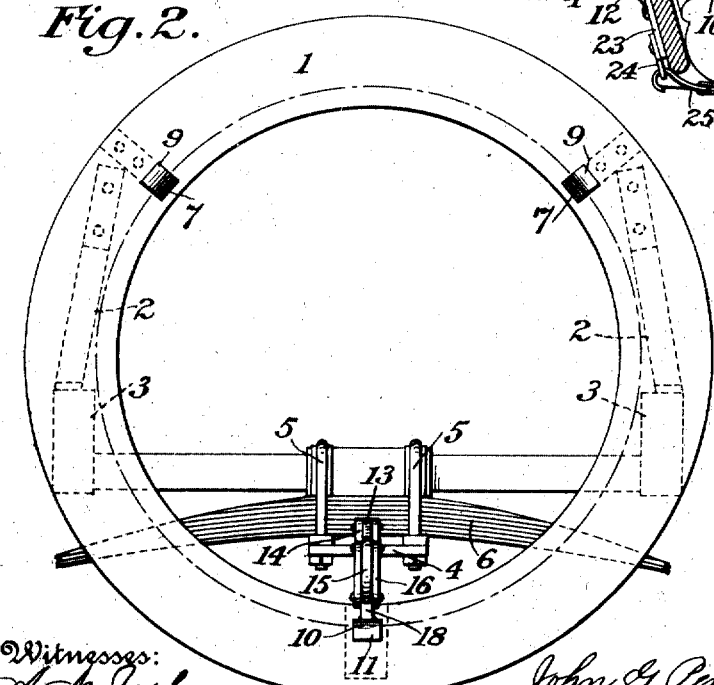
Witnesses:
A. N. Jesbera
F. E. Manuel
Inventor:
John G. Perrin
By his Attorneys
Messimer & Austin

UNITED STATES PATENT OFFICE.

JOHN G. PERRIN, OF DETROIT, MICHIGAN.

TIRE-CARRIER FOR AUTOMOBILES.

1,251,689.     Specification of Letters Patent.     Patented Jan. 1, 1918.

Application filed November 11, 1912, Serial No. 730,603. Renewed May 22, 1917. Serial No. 170,270.

*To all whom it may concern:*

Be it known that I, JOHN G. PERRIN, a citizen of the United States, and a resident of Detroit, in the county of Wayne and State of Michigan, (whose post-office address is Detroit, Michigan,) have invented certain new and useful Improvements in Tire-Carriers for Automobiles, of which the following is a specification.

This invention relates to tire carriers for automobiles and has for its primary object the devising of means for securing an emergency tire rigidly to a carrier by the application of devices engaging the inner or rim side of the tire only, said means being adjustable to exert an outward pressure on the tire to effect a securing of it firmly in place, thereby obviating the necessity of the usually employed straps that are passed entirely about the tire.

A further object of the invention is to devise a skeleton carrying device for the tire in which the several parts are so united as to make a unit of them thereby combining lightness with rigidity and strength.

The various other objects of the invention will be more fully set forth in the following description of one embodiment of the invention which consists in the new and novel features hereinafter set forth and claimed.

Referring to the accompanying drawings:—

Figure 1 is a fragmental side elevation of parts of the rear portion of an automobile, partly in section, and a central vertical section of the carrier and tires partly in section, and Fig. 2 is a view of the carrier attached to the automobile looking from the rear.

The carrier is most conveniently secured to the rear of the automobile, and preferably in the manner shown in the drawing. It comprises a frame or support 1 against which the tire rests. This is preferably circular in contour and of a diameter equal to, or slightly less than the outer diameter of the tire. It is preferably made in the form of an open frame having an interior diameter approximately equal to the interior diameter of the tire. Such a formation enables it to be entirely or substantially concealed by the tire which rests against it.

The open interior permits easy access to the parts of the automobile behind the frame, and also permits the rear lamp to be mounted in the usual position behind the carrier.

The frame 1 is preferably supported in an inclined position by means of braces 2—2 secured at their lower ends to the side members 3 or other part of the chassis of the automobile, and at their upper ends to the rear face of the frame at points above the horizontal. The braces are preferably inclined upwardly and outwardly at an angle of about 45 degrees in order that they may serve in supporting the weight of the frame and tire, and at the same time hold the frame from sidewise movement. A third brace 4 secures the frame at its lower central position to the spring fastenings 5 of the rear spring 6.

Brackets 7 are secured to the frame 1 preferably at points on the rear face thereof, and project frontwardly to a sufficient extent to support the entire width of the inner or rim side of the tire 8. Their ends are turned outwardly to form gripping fingers 9 for better holding the tire in place. Two of these brackets are shown, these being adequate to support the weight of the tire, but more may be used if desired. They are preferably spaced about sixty degrees from the vertical, which is preferably the points best suited for the securing of the braces 2 to the frame 1. A third tire engaging member or plate 10 is arranged to engage the inner side of the tire preferably at its central lower point and is provided with an outwardly turned end 11 similar to those formed upon the supports or brackets 7.

The plate 10 is pivotally secured to an ear 12 formed on the bracket 4. By means of this pivotal connection the plate is easily swung down into engagement with the tire as shown in Fig. 1, or may be swung up into the opening of the frame 1 clear of the tire, in order that the tire may be easily lifted from the brackets 7 when desired for use. The swinging of the plate 10 is accomplished by means of a toggle connection comprising a lever 13, pivotally connected at one end to an ear 14 formed on the bracket 4, and having its forward end formed into a handle 15 for raising and lowering it and a link 16 pivotally connected at one of its ends to the lever at a point 17 between the pivotal end of the lever and handle 15, and at its other end to an ear 18 formed on the plate 10.

The parts are suitably proportioned in order that the lever 13 when operated downwardly will force the plate 10 hard against the tire, the ear 18 acting as a stop for the handle 15 when brought to this position. The relative positions of the several parts when locked are such that the pivot 17 is sufficiently below the line connecting the pivotal connections on the ears 14 and 18 to insure a stable locking action upon the plate 10, which will not be interrupted until the handle 15 is manually raised.

When the plate 10 is forced down upon the tire, the latter is drawn down upon its supports 7 and held firmly in place, the outwardly turned end portions on the supports 7—7 and 10 serving to prevent the tire from being pulled off the supports. When the handle 15 is raised the plate 10 is turned upwardly away from the tire, which may then be easily lifted from the supports 7. Other means than that shown may be employed for giving the relative movement to the supports for the tire, it only being necessary that a relative spreading movement be imparted to the members, so that in this position they will hold the tire firmly in place, and that when released the tire may be easily removed.

By securing the brackets 7 and braces 2 substantially at the same points upon the frame 1, and the plate 10 directly to the brace 4 the least strain is put upon the frame by the weight of the tire. The frame may be made of light material such as wood or light weight angle irons. It serves as a means for tying the several tire supports and braces together to form a rigid skeleton structure.

Fig. 1 shows a device constructed to carry a second tire 19. Here extensions 20 are secured to the brackets 7 for supporting the tire. They are provided with out-turned ends 21 similar to those formed on the brackets 7. The tire is drawn down snugly upon the extensions by means of a strap 22. The strap is secured at one end to the bracket 4, which, for this purpose is provided with an extension 23. The strap may be secured to the extension in any desired manner, that shown comprising an eye 24 secured to the extension and a hook, 25, engaging the eye, which is secured to the strap.

The strap has two runs 26 and 27, which pass beneath and adjacent to the tire 8, and around the central lower portion of the tire 19. The strap is provided with the usual buckle 28 enabling it to be drawn tight. The purchase which it obtains by passing beneath the tire 8 enables it to exert a downward drawing effect upon the tire 19 similar to the action of the plate 10. This holds the tire snugly upon the extensions 20 and holds the lower portion firmly against the tire 8.

Although I have shown only one embodiment of my invention, it is obvious that various changes may be made therein without departing from the spirit of the invention, provided the means set forth in the following claims are employed.

Having thus described my invention, I claim:—

1. In a tire carrier, the combination of an annular ring having a rigid supporting arm mounted on the upper portion thereof and extending outward from the ring, a movable member comprising a plate adapted to engage with the tire and having an arm thereon pivoted to the ring, a link pivoted to said plate, a lever pivoted to said link and to a stationary support and a handle secured at the pivotal point of said lever and link by means of which the plate may be forced downward and inward toward the ring.

2. In a tire carrier, the combination of a rigid frame adapted to support the tire, a movable plate adapted to engage the tire, said plate being fastened to the frame to have a swinging movement with relation thereto and means for swinging said plate into and out of engagement with the tire, comprising a lever of two parts pivoted together, one of said parts being pivoted to the plate and the other part being pivoted to the frame and a handle secured to said lever at the junction of the parts for moving the pivotal points into and out of alinement whereby the plate will be locked in position when the pivoted points of the lever are in line with each other.

3. In a tire carrier, the combination of a rigid frame adapted to support the tire, a movable plate adapted to engage the tire, said plate being fastened to the frame to hold the same with relation thereto and means for moving said plate into and out of engagement with the tire, comprising a two part lever, one of said parts being pivoted to the plate and the other part being pivoted to the frame and a handle secured to said lever at the junction of the parts for moving said pivotal points of the lever into and out of alinement whereby the plate will be locked in position when the pivotal points of the lever are in line with each other.

4. In a tire carrier, the combination of a fixed tire support, a tire-engaging means movable toward and from said fixed support, means for guiding said movable means into and out of engagement with the tire, and means for actuating said guided means, comprising a pivoted lever and a link connecting said lever and said movable tire-engaging means.

5. In combination, a support adapted to engage one side of a tire, a fixed, upper, tire supporting bracket extending from one side thereof, a lower tire engaging member pivoted to the frame, a lever fixedly pivoted on the side of said support opposite the tire engaging side, a link pivoted to said lever and to said member, all of said pivotal connections being in the same plane whereby said member may be swung by a pull on said lever into position to clear the tire engaging side of said support.

6. A tire carrier and frame for supporting the tire, comprising a fixed supporting bracket extending from the frame and engaging the inner side of the tire, a pivoted tire engaging member adapted to move in a direction away from the bracket and to draw the tire into firm engagement therewith, and means comprising a toggle lever and a handle for moving the tire engaging member toward and away from the tire and for automatically locking it in its final position in its movement away from the bracket.

7. In a tire carrier, a frame for supporting the tire on one side thereof, rigid supports extending from the frame for engaging the inner sides of the tire, a movable support for the tire secured to the frame and having a pivotal connection, a lever secured to the frame and having a pivotal connection, a link having one of its ends pivotally connected to the movable support and its other end pivotally connected to the lever and a stop for arresting the movement of the said lever when the pivotal connection of the link and lever has been moved below its alinement with the other pivotal connection of the link and pivotal connection of the lever.

8. A tire carrier comprising fixed supports for a pair of tires, means engaging one of said tires for positively forcing the same in a direction toward the fixed supports to draw said tire in firm engagement therewith, flexible means looping the other tire and engaging the outer periphery of the first mentioned tire, said flexible means being attached to a fixed support whereby movement of the first mentioned tire away from the supports will automatically lock the other tire in firm engagement with the brackets.

9. In a tire carrier, the combination with a stationary support, of a pivoted tire engaging member, locking means pivotally connected to said support and adapted to lock said support in adjusted position and a handle on said locking means for moving said movable member in a direction away from said stationary support thereby to lock the tire in position by a single movement of the handle.

10. A tire carrier comprising a stationary support and a movable tire engaging member, a locking lever comprising two members pivoted together, one of said members being pivotally secured to the tire engaging member and the other being pivoted to a fixed support, and a handle secured to said lever for actuating the same to move the tire engaging member in a direction away from the stationary support and draw the tire into firm engagement therewith and automatically lock the tire in position by a single movement of said handle.

11. In a means for drawing a tire into position on a support, the combination with a support of a three eared lever pivoted by one of its ears to said support, another of said ears being elongated to constitute a handle, a link having one end connected to the third ear and a tire engaging member pivoted intermediate its length to the other end of said link, said member having one end pivoted to the support with the free end thereof adapted to move to and from its tire engaging position.

12. In a tire carrier, the combination with a bifurcated bracket, and a tire engaging member carried by said bracket, of an engaging element pivoted to one arm of said bracket, a lever supported by the other arm of the bracket and a connecting link between said lever and element.

13. In a tire holder, the combination with a tire-engaging member, of a pivoted clamping member swinging in a plane transverse to a tire engaged with the member, and a toggle connected to the clamping member and operating in the same plane therewith for moving said clamping member into and out of engagement with a tire.

14. In a tire holder, the combination with spaced tire supports, of a pivoted clamping member swinging in a plane between the supports and transverse to a tire placed thereupon, and a toggle link connected to the clamping member and operating in the same plane therewith for moving said clamping member into and out of operative engagement with a tire.

15. In a tire holder, the combination with a fixed tire-engaging member, of a pivotal tire-engaging member swinging toward and from the fixed member, and a toggle connecting the fixed member and the pivotal member for swinging the latter toward and from the fixed member.

16. In a tire holder, the combination with a fixed tire-engaging member, of means for mounting the same on a vehicle in fixed relation thereto, a swinging tire-engaging member movable toward and from the fixed member in a plane transverse to a tire engaged by said member, and a toggle connecting the fixed member and the pivoted member for swinging the latter.

17. In a tire holder, the combination with spaced fixed tire-engaging members, of a pivotal tire-engaging member swinging toward and from the fixed members, and a toggle mounted on the fixed members and connected to the pivotal member for swinging the latter.

18. In a carrier for vehicles, the combination of a ring, attaching means for securing the ring to a vehicle, fixed means adjacent the top of the ring for holding a demountable rim on the ring, and means on the ring and adjacent the lower portion thereof movable into position transversely of the plane of the rim for securing the lower portion of the rim.

19. In a tire carrier for vehicles, the combination of supporting means for engaging the inner periphery of a tire at a plurality of points about the upper portion thereof, a continuous circular member fixed relative to said means, extending in a general vertical plane and designed to engage the supported tire on one side thereof, a plurality of spaced apart brackets for supporting said circular member at a distance rearwardly from the vehicle, and fastening means fixed circumferentially of the circular member and positioned adjacent the lower portion thereof, said fastening means being adjustable manually from the side of the tire opposite the side engaging the circular member and movable into engagement with the tire to force the upper portion of the same downwardly into firm engagement with the supporting means and to force the lower portion of the tire laterally into engagement with the circular member.

20. In a tire carrier for vehicles, the combination of supporting means for engaging the inner periphery of a tire at a plurality of points about the upper portion thereof, a continuous circular member fixed relative to said means, extending in a plane inclined from the vertical and designed to engage the supported tire on one side thereof, and fastening means fixed circumferentially of the circular member and positioned adjacent the lower portion thereof, said fastening means being adjustable manually from the side of the tire into engagement with the tire in a direction to force the upper portion of the same downwardly into firm engagement with the supporting means and to force the lower portion of the tire laterally into engagement with the circular member.

21. In a tire carrier for vehicles, means adapted to extend into and support a demountable rim at spaced apart points on the periphery thereof, said means providing an opening adapted to receive any projection, such as the tube valve, which might extend inwardly from the inner periphery of the rim, and a clamp on said means located substantially diametrically opposite to said projection receiving opening and adapted to be adjusted into or out of engagement with said rim.

22. In a tire carrier for vehicles, the combination of a supporting ring adapted to receive a demountable rim on one side thereof, attaching means for securing the ring to the vehicle, fixed means at one point on said ring adapted to engage and retain the rim against removal from the ring at that point, and an adjustable clamp at another point on said ring adapted to be adjusted into or out of engagement with said rim at that point.

23. In a tire carrier for vehicles, the combination of a supporting ring adapted to contact with a demountable rim and having fixed means at one side thereof for retaining the rim, attaching means for securing the ring to a vehicle, fixed means at one point on the other side of said ring adapted to receive and retain the rim at that point, and adjustable means at another point on the latter side of the ring adapted to be adjusted into or out of engagement with said rim at that point.

24. In a tire carrier for vehicles, the combination of supporting means designed to provide a plurality of supporting points disposed in a circle of a size to fit into a demountable rim, attaching means for securing the supporting means to a vehicle, a member fixed at one point in said supporting means adapted to engage and retain said rim at that point and a rotatable clamping member at another point in said circular support adapted to be turned into or out of engagement with said rim at that point.

25. In a tire carrier for vehicles, the combination of supporting means designed to provide a plurality of supporting points disposed in a circle of a size to fit into a demountable rim, attaching means for securing the supporting means to a vehicle, a member fixed at one point in said supporting means adapted to engage and retain said rim at that point, a rotatable clamping member at another point in said circular support adapted to be turned into or out of engagement with said rim at that point and holding means for retaining said clamping member in locking position with respect to said rim.

26. In a carrier for vehicles, the combination of a supporting ring having bearings carried thereby for extending into the opening and for engaging the inner periphery of a demountable rim, attaching means for securing said ring to a vehicle and means for removably securing the rim to said ring.

27. In a vehicle tire carrier, the combination of a ring adapted to be engaged by a demountable tire supported therefrom, attaching means for securing the ring to a vehicle, a bar supported from the vehicle and facing the open space outlined by the ring and means for removably securing the rim to said ring.

28. In a carrier for vehicles, the combination of a support, provided with means extending laterally from the general plane of the support and adapted to fit into a demountable rim, a peripheral stop member extending from said support at one portion thereof, attaching means for securing the support to a vehicle and means for securing the rim on said support in contact with said peripheral stop member.

29. In a tire carrier for vehicles, the combination of a support adapted to engage the inner periphery of a tire to support the same, a continuous member extending outwardly at an angle to said support and designed to extend across one side of the tire positioned on the support and a fastening member spaced from the portion of the support carrying the tire, movable transversely of the plane of the tire and designed to engage the tire on the side thereof opposite the side engaging said member to force the tire into engagement with said member.

30. In a tire carrier for vehicles, the combination of means designed to engage the upper portion of the inner periphery of a demountable tire to support the same, an outwardly extending stop member designed to engage the lower portion of one side of the tire to prevent lateral movement thereof in one direction and fastening means positioned to engage the lower portion of the tire on the side thereof opposite the side adjacent the stop member, said fastening means including mechanism designed to force the tire laterally into engagement with said member.

This specification signed and witnessed this 1" day of November, A. D., 1912.

JOHN G. PERRIN.

Signed in the presence of—
ANNA A. BYRNE,
SAMUEL C. YEATON.